United States Patent
Park et al.

[11] Patent Number: 6,126,749
[45] Date of Patent: Oct. 3, 2000

[54] APPARATUS FOR MANUFACTURING REACTION BONDED SILICON CARBIDE

[75] Inventors: Sang-Whan Park; Huesup Song; Sang-Dong Kim; Jo-Woong Ha, all of Seoul, Rep. of Korea

[73] Assignee: Korea Institute of Science and Technology, Seoul, Rep. of Korea

[21] Appl. No.: 09/054,819

[22] Filed: Apr. 3, 1998

Related U.S. Application Data

[62] Division of application No. 08/652,324, May 22, 1996, Pat. No. 5,770,262.

[30] Foreign Application Priority Data

May 22, 1995 [KR]   Rep. of Korea ................... 95-12784

[51] Int. Cl.[7] .................................................... B05C 11/02
[52] U.S. Cl. .................................................. 118/64; 118/66
[58] Field of Search ................................... 427/314, 316, 427/227; 118/58, 66, 109, 64

[56] References Cited

U.S. PATENT DOCUMENTS

| | | |
|---|---|---|
| 3,205,043 | 9/1965 | Taylor . |
| 3,325,346 | 6/1967 | Osborg . |
| 3,348,967 | 10/1967 | Hucke . |
| 4,240,835 | 12/1980 | Laskow et al. . |
| 4,626,516 | 12/1986 | Morelock . |
| 4,737,328 | 4/1988 | Morelock . |
| 5,079,195 | 1/1992 | Chiang et al. . |

FOREIGN PATENT DOCUMENTS 2 227 483A   1/1990   United Kingdom .

*Primary Examiner*—Brenda A. Lamb
*Attorney, Agent, or Firm*—Scully, Scott, Murphy & Presser

[57] ABSTRACT

A method and an apparatus for manufacturing a reaction bonded silicon carbide by the infiltration of molten metal by using a porous silicon carbide/carbon or carbon preform in which the molten metal is supplied to the carbon preform by capillary action through a pyro-carbon coated dense graphite feeder on which a transfer path of molten metal is defined from a molten metal supplier under an inert atmosphere, and a carbon woven fabric on which the carbon preform is placed transfers continuously the carbon preform at a constant speed and thereby infiltrates the carbon preform.

The apparatus and method for manufacturing a reaction bonded silicon carbide which enable mass production of goods of various sizes and characteristics by continuously transferring the carbon preform on the carbon woven fabric and supplying the molten metal through the pyro-carbon coated graphite feeder.

5 Claims, 2 Drawing Sheets

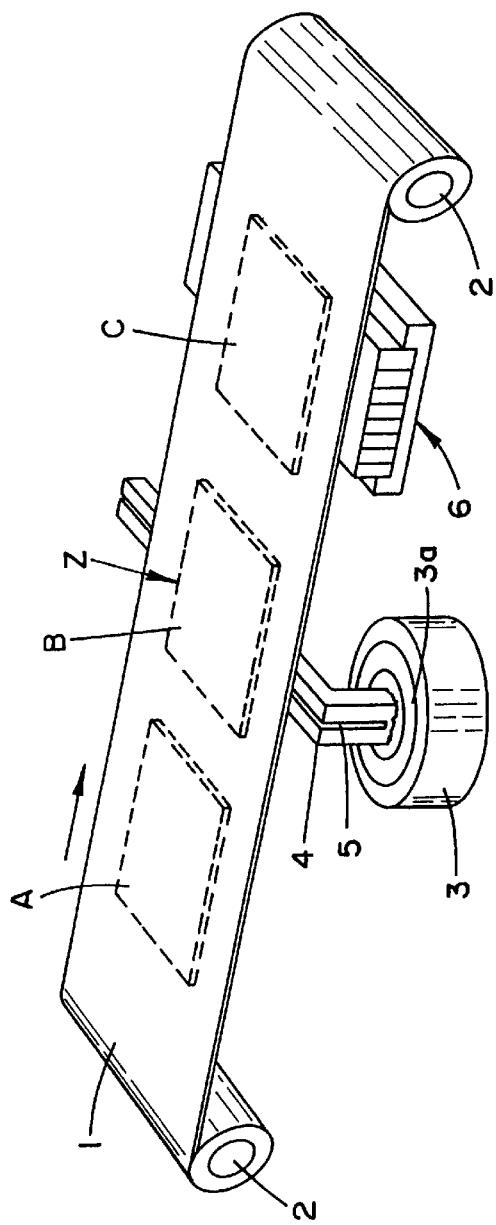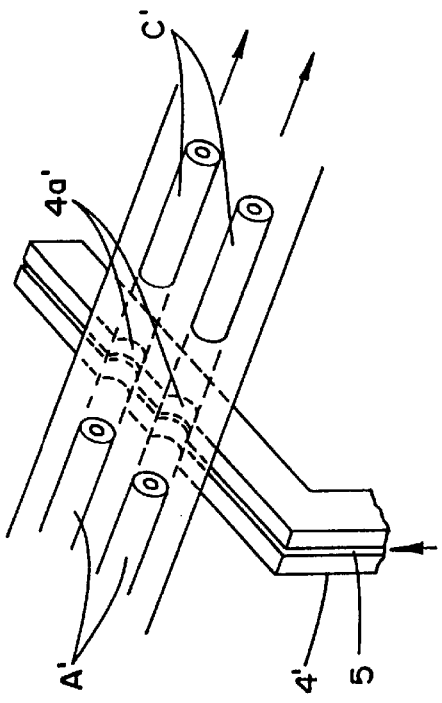

APPARATUS FOR MANUFACTURING REACTION BONDED SILICON CARBIDE

CROSS REFERENCE TO RELATED APPLICATIONS

This is a divisional of U.S. patent application Ser. No. 08/652,324 filed May 22, 1996 now U.S. Pat. No. 5,770,262.

BACKGROUND OF THE INVENTION

1. Field of the Invention

The present invention relates to a production process of a reaction bonded silicon carbide by infiltration of a molten silicon (Si) or silicon-molybdenum alloy (Si—Mo), and more particularly to an improved apparatus and a method thereof for manufacturing a reaction bonded silicon carbide which are capable of mass production and producing goods continuously of various sizes and characteristics by transferring a carbon preform on a carbon woven fabric and supplying a molten metal through a transfer path or a pyro-carbon coated dense graphite feeder.

2. Description of the Conventional Fabrication Method

Conventionally, since a silicon carbide has an excellent resistance to heat, wear, thermal shock, and high temperature corrosion, and high temperature strength, a silicon carbide has been studied and developed as a structural material for a ceramic engine, a gas turbine, a mechanical seal, an aerospace material, a heat-resistance brick, a ceramic filter for an incinerator, and a high temperature heat exchanger.

Most silicon carbide goods are made by a hot pressing at more than 1800° C. or by a pressure loss sintering at higher than 2000° C., which method has the problems that a processing itself is less economical because the sintered silicon carbide is very difficult to machine to final structure due to a high hardness of silicon carbide.

A method for manufacturing a reaction bonded silicon carbide which uses a molten silicon (or silicon-molybdenum alloy) infiltration has an advantage of obtaining desired final goods economically since by the method a poreless sintered body can be manufactured in a short time at a relatively low temperature range from 1450° C. to 1600° C., and the original size and shape of the preform remains unchanged even after reaction sintering.

In this method, the reaction bonded silicon carbide has the disadvantage that because the application temperature used is limited to below 1400° C. due to the remaining silicon. However, since the reaction bonded silicon carbide has excellent structural material characteristics such as corrosion resistance, high temperature strength, light weight, abrasion resistance, and thermal shock, and sintered silicon carbide materials are used in a temperature below 1200° C., an application range of the carbonized reaction sintered body can be used instead of sintered silicon carbide.

In addition, to increase the application temperature of reaction bonded silicon carbide, reaction bonded silicon carbide has been developed that silicon-molybdenum alloy instead of silicon is infiltrated into carbon or carbon preform forming a Mo—Si intermetallic compound instead of remaining silicon.

The above-described conventional fabrication process for a reaction bonded silicon carbide includes a technique for obtaining a poreless reaction bonded silicon carbide by infiltration of a molten silicon (or silicon-molybdenum ally) into a porous carbon preform in which the carbon is in the shape of a particle, a fiber, or a whisker. Therein, the molten silicon (or silicon-molybdenum alloy) is infiltrated through the pore in the carbon preform a capillary force, and sintered, thereby forming a silicon carbide by the reaction with the carbon therein. Here, the reaction sintered body includes silicon carbide and the remainder of silicon or silicon molybdenum. As describing permeation methods for a molten silicon (or silicon-molybdenum alloy), there are known U.S. Pat. Nos. 3,205,043, 3,325,346, 3,348,967 4,240,835 5,079,195 4,626,516 4,737,328.

The conventional fabrication processes for reaction bonded silicon carbide sintered body include a method of heating silicon (or silicon-molybdenum alloy) above melting temperature with a carbon preform under high vacuum or inert atmosphere, or a method of infiltration of a molten metal into a carbon preform through a carbon woven fabric by heating the carbon preform and silicon (or silicon-molybdenum alloy) on the carbon woven fabric.

Also, there is a method described in U.S. Pat. No. 4,626,516 in which carbon preform is placed in a melting container for silicon which has a hole for infiltration of a molten silicon, the hole and the carbon preform are connected with carbon fibers, and then the molten silicon is infiltrated into the carbon preform through capillary action.

As described above, since the conventional fabrication method for a reaction bonded silicon carbide uses a batch process wherein a high vacuum or sufficiently inert atmosphere must be maintained to prevent interruption of the infiltration process due to oxidation of the molten silicon (or silicon-molybdenum alloy), the process cost is high and not economical especially for achieving mass production of large-sized reaction bonded silicon carbides.

In the fabrication method of a reaction bonded silicon carbide, since it requires a few to tens of minutes to produce a silicon carbide synthesis by the infiltration and reaction of molten silicon (or molten silicon-molybdenum alloy), it has been anticipated to develop a more economical fabrication process for a reaction bonded silicon carbide in which the continuous infiltration of a molten silicon (or molten silicon-molybdenum) can be performed, and to meed such anticipation, there is disclosed in a British patent GB 2,227, 483A, an example of a continuous fabrication process for a reaction bonded silicon carbide in which reaction bonded silicon carbides are continuously manufactured by developing a molten silicon crucible and a heating method and passing a carbon fiber through molten silicon. But, a fabrication method for a plate-type or a tube-type reaction bonded silicon carbide has not yet been developed.

SUMMARY OF THE INVENTION

Accordingly, it is an object of the present invention to enable mass production of goods at reduced cost of manufacture by a continuous fabrication method for a reaction bonded silicon carbide.

Also, another object of the present invention is enabling reaction bonded silicon carbides having various characteristics without any size limitations by a simple change in the fabrication and process and apparatus.

To achieve the above object, there is provided a manufacturing apparatus for a reaction bonded silicon carbide according to the present invention which includes a reactor having an entrance defined on one side for inputting a carbon preform and an exit defined on the other side for outputting a completed reaction bonded silicon carbide, a carbon woven fabric which is transferred at a regular speed inside the reactor, a transfer apparatus which transfers the carbon woven fabric continuously, a molten metal supplier in which there is provided one of a molten silicon and a silicon-molybdenum alloy) to be supplied to the carbon preform which is to be inputted through the entrance of the reactor, one of a pyro-carbon coated dense graphite feeder which is located between the molten metal supplier and the carbon woven fabric and has a transfer path on which the molten metal is supplied to the carbon preform on the carbon woven fabric, and an excess molten metal remover which removes a metal excessively infiltrated into the carbon preform after sintering.

For the fabrication of tube-type reaction bonded silicon carbide, the same shape of a tube-type carbon preform the pyro carbon coated dense graphite feeder is needed so that the contacted surface between the preform and the molten metal supplied thereon may be increased.

In addition, two to five of the pyro-carbon coated graphite feeder are stacked vertically in the reactor, and carbon woven fabric is placed therebetween, respectively, so that a large amount of material may be sintered at one time.

And, the transfer path defined on the upper surface of the pyro-carbon coated dense graphite feeder can be desirably formed to be 5~1.2 mm wide and 2$^{-4}$ mm deep.

Further, a method to fabricate the reaction bonded silicon carbide by using this apparatus includes supplying the molten metal to the carbon preform by capillary action through the pyro-carbon coated dense graphite feeder thereon defining a transfer path of molten metal from the molten metal supplier under an inert atmosphere, and continuously transferring the carbon preform on the carbon woven fabric at the regular speed. In an early stage the carbon preform is placed on the carbon woven fabric, the entrance and the exit of the carbon preform are closed, and then the carbon preform and a molten metal supplier are heated to over 1450° C. under a vacuum atmosphere of below 10$^{-2}$ torr, and when the molten metal starts to infiltrates into carbon preform through carbon woven fabric, the atmosphere of the reactor is changed to an inert atmosphere and the entrance and the exit are opened and carbon preform starts to be continuously transferred and the excess molten metal which remains on the surface of the reaction bonded silicon carbide is removed by the remover.

Although the carbon preform is continuously supplied from the outside, the process is effective to prevent the clogging of the infiltration process of the molten metal due to the formation of a surface oxide film on the molten metal when the molten metal is infiltrated.

BRIEF DESCRIPTION OF THE DRAWINGS

FIG. 1 is a perspective view showing an inner construction and a sintering process of a reaction bonded silicon carbide according to an embodiment 1 of the present invention;

FIG. 2 is a perspective view showing a transfer path for a molten silicon (or silicon-molybdenum alloy), particularly a sintering process for a tube-type carbon perform, according to an embodiment 2 of the present invention.

DETAILED DESCRIPTION OF THE PREFERRED

Figure 3:
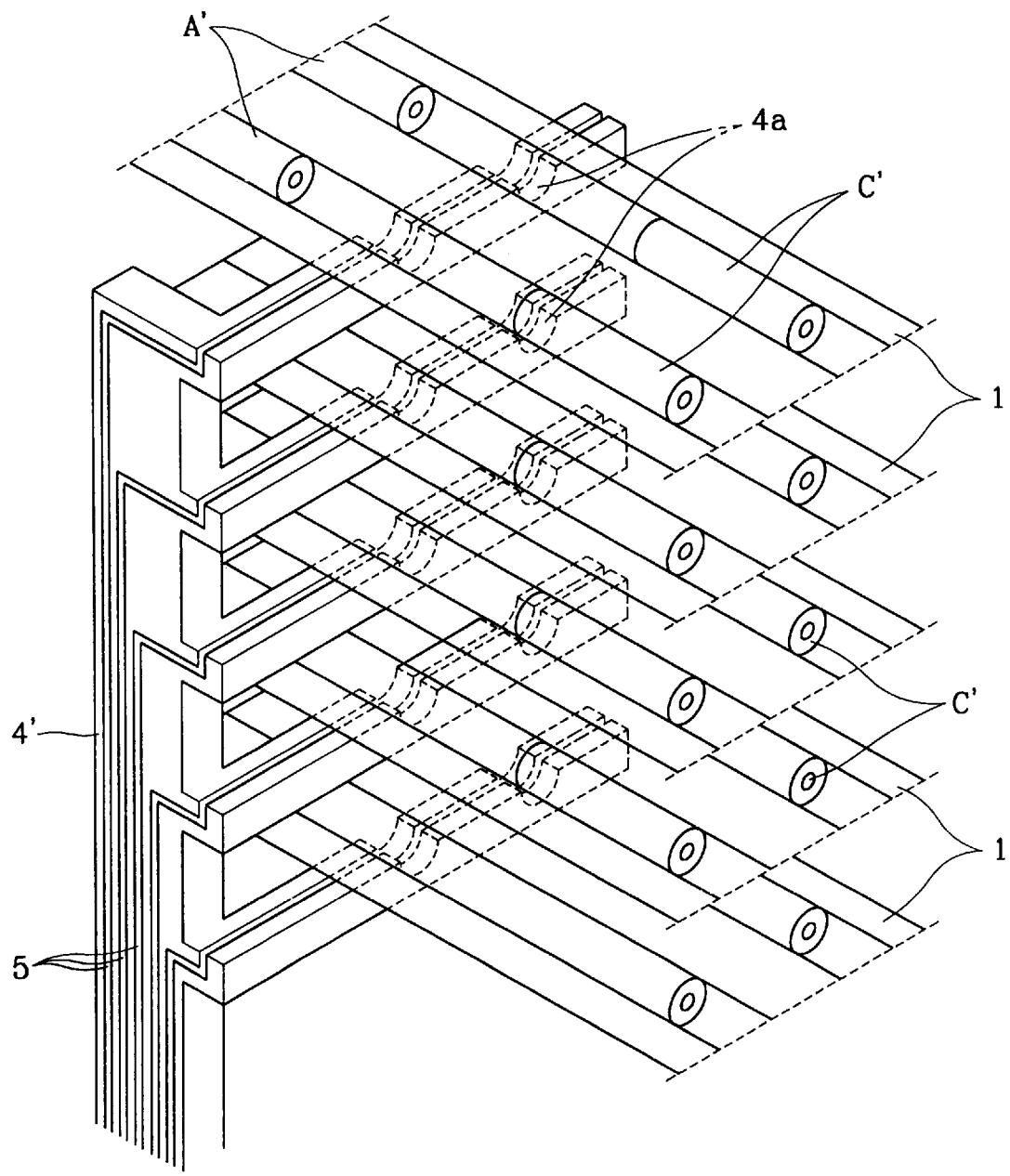
FIG. 3 is a perspective view demonstrating an embodiment similar to the embodiment of FIG. 2 wherein five pyro-carbon coated dense graphite feeders are vertically stacked in the reactor and the carbon woven fabric is placed therebetween.

The apparatus and method for manufacturing a reaction bonded silicon carbide will be described in more detail with reference to the accompanying FIGS. 1 and 2.

Embodiment 1

A reaction bonded silicon carbide is manufactured by using a silicon carbide/carbon or carbon preform. Carbon content in the silicon carbide/carbon preform is ten (10) to (50) weight percent, and silicon carbide and carbon powder are mixed with acetone solvent for ten (10) hours by adding three (3) to ten (10) weight percent of phenolic resin as a binder. The mixed powder is dried by a thermal agitation method, and a 40×40×10 mm size of a carbon preform for a test specimen is formed by a dry pressing, and followed by a cold isostatic pressing of a 5000~15000 psi. A carbon preform is heat treated at 800° C. in a nitrogen atmosphere, and the phenolic resin binder is decomposed therein. The porosity of a debinded silicon carbide/carbon or carbon preform ranges from forty to fifty volume percent.

The debinded silicon carbide/carbon or carbon preform A is placed on a carbon woven fabric 1 and then moved to the infiltration zone Z by transferring the carbon woven fabric 1 through a transfer apparatus 2 on which the permeation of a molten silicon 3$a$ occurs, and a molten silicon supplier 3 and an excess molten metal remover 6 are heated under a vacuum of below 10$^{-2}$ torr, that is, at 1450~1700° C., 1450~1500° C., and 1600~1800° C., respectively.

After the molten silicon 3$a$ is infiltrated into carbon preform through the carbon woven fabric 1 along the transfer path 5 of the pyro-carbon coated dense graphite 4, the atmosphere within the reactor (not illustrated) is changed to an inert gas atmosphere, and the entrance and the exit of the reactor (not illustrated) are opened and the carbon woven fabric 1 begins to be transferred and the carbon preform B is infiltrated into the molten silicon or silicon alloy 3$a$. Once the infiltration by the molten silicon begins to occur, a pressurized atmosphere is maintained by an inert gas within the reactor, although the entrance and the exit thereof are exposed to the air, the infiltration process of the molten silicon 3$a$ has had no difficulty. The optimum temperature of the infiltration zone for infiltration of the molten silicon 3$a$ ranges from 1450° C. to 1700° C., and the optimum temperature of the molten silicon supplier 3 desirably ranges from 1450° C. to 1500° C. In the desired size of the test piece used in embodiment 1, the optimum transfer speed of the carbon preform is one to five cm/min. In addition, silicon or silicon alloy is supplied to the molten metal supplier at a constant speed.

Any excess silicon remaining on the surface of the infiltrated reaction bonded silicon carbide C after the infiltration is removed while passing an excess remaining silicon remover 6 made of a porous carbon preform or carbon felt, wherein the desired temperature ranges from 1600° C. to 1800° C. Then the completed reaction bonded silicon carbide from which the excess remaining silicon has been removed is directed to come out of the reactor through the exit, and thereby the entire process is completed.

The appearance density of the completed reaction bonded silicon carbide ranges from 3.0 to 3.15 g/cm$^3$, and the content of the entire silicon carbide in the sintered body calculated from the appearance density ranges from 80 to 95 weight percent. The fracture strength of reaction bonded silicon carbide fabricated at room temperature ranges from 300 to 400 MPa, and the fracture strength thereof was not influenced by the transfer speed of the carbon preform.

Embodiment 2

A tube-type reaction bonded silicon carbide is fabricated with a silicon carbide/carbon or carbon preform. The carbon content in the silicon carbide/the carbon preform ranges from ten to fifty weight percent, and the silicon carbide and a carbon powder are mixed with an acetone solvent for ten

(10) hours by adding three (3) to ten (10) weight percent of a phenolic resin as a binder.

The mixed powder is dried by thermal agitation and thereby a tube-type carbon preform having a 50 mm external diameter and 500 mm length is manufactured by the cold isostatic pressing at 5000~15000 psi. A carbon preform is heat treated for two hours at 800° C. in a nitrogen atmosphere, and the phenolic resin as a binder is decomposed therein. The porous or the debinded silicon carbide/carbon or carbon preform ranges from forty five percent to sixty volume percent.

The fabrication method of the present embodiment 2 is similar to the process of embodiment 1, but a pyro-carbon coated dense graphite feeder 4' having an arc-shaped groove 4a on the upper surface of the graphite is used for the molten silicon transfer path so that a uniform infiltration may be performed within a short time by increasing the contacted surface between the tube-type carbon preform A' and the molten silicon 3a during the infiltration process.

Also in the continuous fabrication method for a tube-type reaction bonded silicon carbide C', the optimum temperature of the infiltration zone for the infiltration of molten silicon ranges from 1450° to 1700° C., and the optimum temperature of the molten silicon supplied 3 desirably ranges from 1450° C. to 1500° C. In the desired size of the test piece used in embodiment 1, the optimum transfer speed of the carbon preform is 0.5~2.0 cm/min. The appearance density of the fabricated reaction bonded silicon carbide ranges from 3.0~3.1 g/cm$^3$.

As described in detail above, the improved fabrication method for a reaction bonded silicon carbide according to the present invention is continuously performed and is capable of achieving mass production, having the effect of reducing the fabrication cost and producing various sizes and shape such as a plate-type or a tube-type.

What is claimed is:

1. An apparatus for manufacturing reaction bonded silicon carbide which comprises:

a reactor having an entrance on one side thereof for inserting a carbon preform therein and an exit on the opposite side for discharging reaction bonded silicon carbide therefrom;

a carbon woven fabric which moves at constant speed inside the reactor;

a transfer apparatus which continuously moves the carbon woven fabric;

a molten metal supplier which provides molten silicon and a silicon-molybdenum alloy to the carbon preform on the carbon woven fabric through a pyro-carbon coated dense graphite feeder;

the pyro-carbon coated dense graphite feeder located between the molten metal supplier and the carbon woven fabric, the pyro-carbon coated dense graphite feeder having a transfer path through which the molten silicon and silicon-molybdenum alloy are supplied to the carbon preform conveyed on the carbon woven fabric whereby the reaction bonded silicon carbide is formed; and an excess molten metal remover which removes excess silicon and silicon-molybdenum alloy which infiltrates into the reaction bonded silicon carbide.

2. The apparatus of claim 1 wherein an upper surface of the pyro-carbon coated dense graphite feeder is provided with a groove whereby contact surface between the carbon preform and the molten metal supplied thereon is increased.

3. The apparatus of claim 2 wherein two to five of the pyro-carbon coated dense graphite feeders are vertically stacked in the reactor with carbon woven fabric disposed therebetween.

4. The apparatus of claim 1 wherein two to five of the pyro-carbon coated dense graphite feeders are vertically stacked in the reactor with the carbon woven fabric disposed therebetween.

5. The apparatus of claim 1 wherein the transfer path is provided on an upper surface of the pyro-carbon coated dense graphite feeder and is about 1.5 to about 1.2 mm wide and about 2 to about 4 mm deep.

\* \* \* \* \*